UNITED STATES PATENT OFFICE.

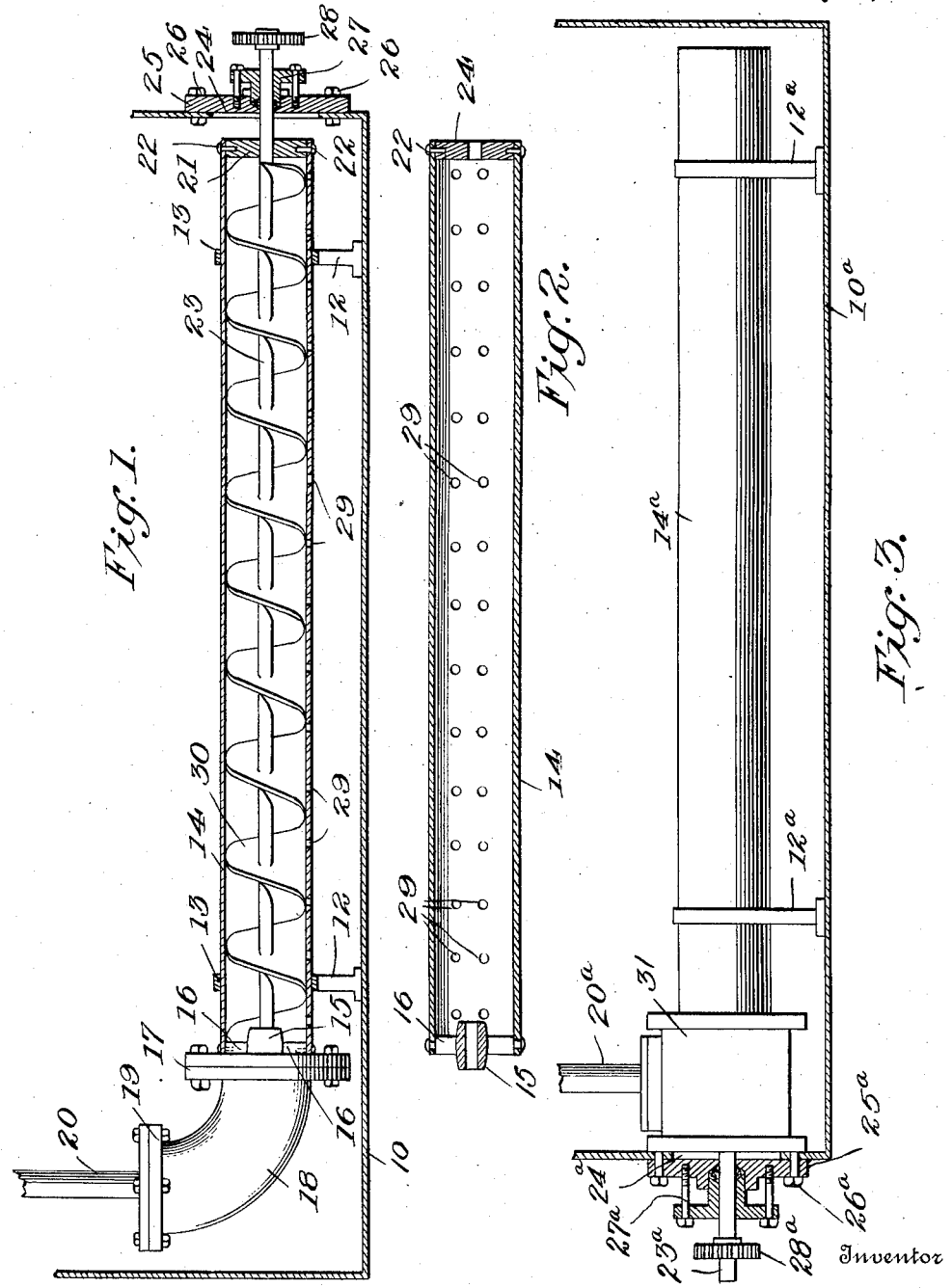

MERTON G. WILD, OF LOVELAND, COLORADO, ASSIGNOR OF ONE-HALF TO FOREST G. AKIN, OF LOVELAND, COLORADO.

SUGAR-MANUFACTURING APPARATUS.

1,034,176.  Specification of Letters Patent.  Patented July 30, 1912.

Application filed March 30, 1912. Serial No. 687,370.

*To all whom it may concern:*

Be it known that I, MERTON G. WILD, a citizen of the United States, residing at Loveland, in the county of Larimer and State of Colorado, have invented certain new and useful Improvements in Sugar-Manufacturing Apparatus, of which the following is a specification.

This invention relates to sugar manufacturing apparatus and is designed particularly to improve the gas tubes located in the carbonation tanks used in connection with refining sugar.

In order to clearly understand the present invention, it will be necessary to describe that step in the manufacture of sugar to which the present invention relates particularly.

Lime rock or ($CaCO_3$) is burned in a lime kiln, causing a chemical reaction which produces calcium oxid, (CaO) and carbon dioxid, ($CO_2$). This calcium oxid is ground in mills and then slaked producing calcium hydroxid, ($Ca(OH)_2$). This calcium hydroxid is mixed with the beet or cane juice in what is known as carbonation tanks and acts upon the beet or cane juice to collect the impurities therefrom. After the calcium hydroxid has acted upon the cane or beet juice, the same is removed therefrom, taking with it all impurities; but before the above can be done another chemical reaction must take place. A gas tube is placed in the base of the bottom of the carbonation tank and distributes the carbon dioxid through the mixture of calcium hydroxid and cane or beet juice, said carbon dioxid formed by the burning of the lime rock ($CaCO_3$) in the kiln originally. The gas is fed into the gas tube aforesaid, and passes therefrom into the mixture surrounding the gas tube by means of smooth holes or perforations formed in the tube. These holes or perforations in the tube are at the present time often closed, by reason of the fact that the calcium hydroxid ($Ca(OH)_2$) and the cane or beet juice forms a scale or incrustation upon the interior of the tube, thus naturally closing the holes and preventing the carbon dioxid gas, ($CO_2$) from passing from the tube into the mixture.

It is the object of the present invention to improve the construction of the gas tube to such an extent that the perforations thereof are constantly kept open. This is done by a constant cleaning mechanism mounted within the tube.

With the above and other objects in view, my invention consists in the construction, combination and arrangement of parts all as hereinafter more fully described, wherein:—

Figure 1 is a section taken through a carbonation tank illustrating the present invention as applied thereto in longitudinal section. Fig. 2 is a horizontal section through the gas tube with the worm removed. Fig. 3 is a section through the carbonation tank illustrating a modified form of the present invention as mounted therein.

Reference being had more particularly to Figs. 1 and 2, 10 indicates an ordinary carbonation tank of any suitable construction, preferably of the form now in use, wherein, cane or beet juice is mixed with calcium hydroxid. A number of standards 12 are mounted in the bottom of the tank 10 and are provided with the bearings 13 at their upper terminals, in which is mounted the gas tube 14. A bearing 15 is mounted in one terminal thereof through the instrumentality of the arm 16, said bearing and arms being so arranged that the carbon dioxid may pass into the tube aforesaid. A plate or flange 17 is mounted on the terminal of the tube 14 adjacent to the bearing 15 and forms a contact between the elbow 18 and said tube. The free terminal of the elbow 18 is connected to a joint 19 and to the carbon dioxid feed pipe 20. The carbon dioxid feed pipe 20 extends to any suitable tank in which the carbon dioxid is stored, after being collected at the kiln, (not shown) during the process of burning the rock lime, ($CaCO_3$,) and produces carbon dioxid, ($CO_2$) and calcium oxid, (CaO). The opposite terminal of the tube 14 is closed by the plate 21 mounted in the tube through the instrumentality of the screws 22 and having a central passage therein, through which projects the terminal of the shaft 23. The wall of the carbonation tank 10 adjacent to this terminal of the tube 14 is pierced by the enlarged opening 24, of such a diameter that when the packing boxes, hereinafter more fully described, are removed, the tube may be withdrawn from the tank for cleansing or other purposes. The shaft 23 projects through this opening into the exterior of the tank. A plate 25 covers the opening 24 aforesaid and is secured to the wall of the carbonation tank 10 by means of the bolts 26. This plate is naturally pierced by the shaft 23, said shaft being surrounded by a packing box 27 which engages the plate 25 and prevents the contents of the tank from leaking through the opening. The outer terminal of the shaft is provided with a gear 28, by means of which, power is transmitted to said shaft. The bottom of the tube 14, which is stationary, is pierced by a number of openings 29, through which the carbon dioxid passes into the tank 10. The calcium hydroxid mixed with the cane or beet juice within the tank, forms an incrustation or scale upon the interior of the tube 14 and prevents the passage of the carbon dioxid from said tube to the tank 10. In order to prevent this incrustation, and to keep the openings or perforations 29 clear, a worm 30 of sheet metal is mounted on the shaft 23 and is of such a diameter that the same completely fills the interior of the tube 14, a sufficient space, which will naturally be minute, being left to permit the rotation of the shaft and worm.

From the foregoing, it will clearly be seen that when it is desired to pass carbon dioxid through the mixture of calcium hydroxid and cane or beet juice within the tank 10, the gas, $CO_2$, is passed through the feed pipe 20, the elbow 18, and into the tube 14, thence through the openings 29 into the tank 10. During the entire time that the tank 10 is being filled with the mixture of calcium hydroxid, whether the carbon dioxid is being passed into the tank or not, the shaft 23 is constantly being rotated, thus at all times keeping the openings clear.

Referring to the preferred form illustrated in Fig. 3, the standards $12^a$ are mounted in the bottom of the tank $10^a$, and carry the stationary tube $14^a$, the interior structure of which is identical with the structure of the tube illustrated in Fig. 1. One terminal of the tube $14^a$ is connected, by a T joint 31 with the feed pipe $20^a$, thus providing a means for directing the carbon dioxid to the tube $14^a$. The shaft $23^a$ located within the tube $14^a$ projects through the T joint 31 to the adjacent wall of the tank $10^a$ through an enlarged opening $24^a$, the purpose of which is similar to the opening 24 in the preferred form. The outer terminal of the shaft $23^a$ is provided with a gear $28^a$ which provides a means of power transmission to the shaft. A plate $25^a$ covers the opening $24^a$ and is retained in position by the plate $26^a$, said plate having a packing box $27^a$ secured thereto to prevent leakage through the openings aforesaid.

Having thus fully described my invention, what I claim is new and desire to secure by U. S. Letters Patent, is:—

1. In a sugar making apparatus, the combination with a carbonation tank, of a gas tube mounted therein, having distributing means therein, and means for constantly cleansing said distributing means.

2. In a sugar making apparatus, the combination with a carbonation tank, of a gas tributing tube mounted therein, having perforations formed therein, and a worm mounted for rotation within said tube.

In testimony whereof I affix my signature in presence of two witnesses.

MERTON G. WILD.

Witnesses:
WILLIAM C. MOORE,
W. O. EATON.

---

Copies of this patent may be obtained for five cents each, by addressing the "Commissioner of Patents. Washington, D. C."